United States Patent [19]

Hamada et al.

[11] Patent Number: 5,311,205
[45] Date of Patent: May 10, 1994

[54] COLOR LIQUID-CRYSTAL DISPLAY APPARATUS WITH RECTILINEAR ARRANGEMENT

[75] Inventors: Hiroshi Hamada; Toshiaki Takamatsu, both of Yamatokoriyama; Naofumi Kimura, Nara, all of Japan

[73] Assignee: Sharp Kabushiki Kaisha, Osaka, Japan

[21] Appl. No.: 829,595

[22] Filed: Feb. 3, 1992

Related U.S. Application Data

[63] Continuation of Ser. No. 629,040, Dec. 19, 1990, abandoned, which is a continuation of Ser. No. 442,391, Nov. 27, 1989, Pat. No. 5,006,840, which is a continuation of Ser. No. 722,619, Apr. 12, 1985, abandoned.

[30] Foreign Application Priority Data

Apr. 13, 1984 [JP] Japan ................... 59-75302

[51] Int. Cl.⁵ ........................................ G09G 3/36
[52] U.S. Cl. ........................................ 345/88; 345/98
[58] Field of Search ............... 340/702, 765, 784, 811; 350/332, 333, 339 F; 345/88, 98, 100

[56] References Cited

U.S. PATENT DOCUMENTS

| | | | |
|---|---|---|---|
| 3,569,614 | 3/1971 | Hanlon . | |
| 3,840,695 | 10/1974 | Fischer | 350/339 F |
| 3,873,870 | 3/1975 | Fukushima et al. | 340/703 |
| 4,470,667 | 9/1984 | Okubo et al. | 350/339 F |
| 4,490,014 | 12/1984 | Levinson | 350/334 |
| 4,593,978 | 6/1986 | Mourey et al. | 340/703 |
| 4,600,274 | 7/1986 | Morozumi | 340/703 |
| 4,642,619 | 2/1987 | Togashi | 340/701 |
| 5,006,840 | 4/1991 | Hamada et al. | 340/702 |

FOREIGN PATENT DOCUMENTS

| | | |
|---|---|---|
| 2534052 | 4/1984 | France ........................... 340/701 |
| 49-57726 | 6/1974 | Japan . |
| 58242548 | 7/1985 | Japan . |
| 2133912 | 8/1984 | United Kingdom . |

OTHER PUBLICATIONS

"Liquid-Crystal Electronics Base and Application" Ohm Co., 1979 p. 8, lines 2–3.

*Primary Examiner*—Jeffery Brier

[57] ABSTRACT

In a color liquid-crystal display apparatus using mosaic arrangements, the same color of picture elements which are driven by the same signal electrode are alternately arranged right and left. Accordingly, all that is necessary is that the same color of picture signal is applied upon the same signal electrode in spite of the mosaic arrangement. Thus, a circuit which switches a color image signal of an analog line memory is unnecessary, so that the driving circuit is extremely simplified.

12 Claims, 9 Drawing Sheets

COLOR LIQUID-CRYSTAL DISPLAY APPARATUS WITH RECTILINEAR ARRANGEMENT

This application is a continuation of application Ser. No. 07/629,040 filed on Dec. 19, 1990, now abandoned, which itself is a continuation of application Ser. No.: 07/442,391, filed on Nov. 27, 1989, now U.S. Pat. No. 5,006,840, which itself is a continuation of application Ser. No.: 06/722,619, filed on Apr. 12, 1985, now abandoned.

BACKGROUND OF THE INVENTION

The present invention relates to the arrangements of picture-element electrodes of a color liquid-crystal display apparatus.

The color liquid-crystal display apparatus is provided with many picture elements arranged in dot-matrix shape and a coloring means arranged corresponding to each picture element. The picture element is an element which constitutes an image, and is composed of a portion wherein electrodes disposed on two opposite substrate overlap each other, and a liquid crystal sandwiched therebetween. Each picture element is controlled through application of a picture signal corresponding to each picture element so that colors are additively mixed in accordance with the same principle as that of a color CRT, with the result that an arbitrary color image including a half tone color image may be displayed. Read "Liquid-Crystal Electronics Base and Application" (Ohm Company, 1979) or the like edited by Sasaki for details on the liquid crystal.

Many modes such as twisted nematic (TN), guest host (GH), dynamic scattering mode (DSM), phase transfer, etc. are available as an operation mode of a liquid crystal display apparatus. Particularly the TN and GH provide favorable results. In the guest host, black die is used and is operated as a so-called black shutter.

Normally additive three primary colors are selected as the colors of the coloring means. An interference filter, a color filter made of inorganic or organic dye or pigment are used in the coloring means. The coloring means may be provided on the outer face of a substrate which constitutes a liquid crystal display apparatus or on the inner face thereof. In the case of the latter, the coloring means may be provided on or below a signal electrode, a scanning electrode, a picture element electrode or a common electrode.

In the color liquid crystal display apparatus, only the spectrum region of one color of three primary colors among the spectra of the incident light can be used and the remaining region are absorbed by the coloring means. In the case of a liquid crystal operation mode using a polarizer, the light intensity to be used in further reduced by half, so that it is very dark in a reflection type mode with no illuminating means in it. Thus, a light source such as incandescent lamp, fluorescent lamp, EL (Electroluminescence) panel or the like is provided or a means for guiding ambient light to the rear face of the liquid crystal display apparatus are provided as the illuminating means. For application into a portable appliance, it is important to improve the radiation efficiency of the light source because of the severe restriction in power capacity. To faithfully reproduce picture signals, many picture elements, i.e., many scanning lines are required. For example, a liquid crystal panel for color television use will be considered.

In the NTSC system of a television broadcasting, the band width of luminance signal (Y signal) is 4 MHz, while the band width of I signal and Q signal which are color phase signals are respectively 1.5 MHz, 0.5 MHz. As the sine waves of the 0.5 MHz includes 26.5 cycle waves in the 1 effective horizontal scanning period (53 microseconds), the horizontal resolution is equivalent to 53 lines or 26.5 line pairs of bright line and dark line. According to the theorem of Shannon, the loss of the information to be contained in the original signal cannot be caused if the sampling operation is performed with a frequency twice the highest frequency of the original signal. However, it is difficult to say that the images provided when the signals sampled in that manner have been reproduced as they are visually faithful to the original signal under the in influences of aliasing. As the result of our experiment the visual satisfaction is provided when the sampling has been performed with a frequency higher than three times the highest frequency. Accordingly, to reproduce the color signal of 0.5 MHz, the information having the original signal can be reproduced almost faithfully if the number of the picture elements of the same color on the same horizontal line is 80 and more.

In a liquid crystal display apparatus provided with many picture elements, one of the following three methods is used to individually control the respective picture elements.

(1) SIMPLE MATRIX

As shown graphically in FIG. 7(A), a stripe shaped electrode group is provided respectively on the two opposite substrates. They are sealed to each other so that they become normal to each other so as to constitute a liquid crystal display. Row selection signals are sequentially applied upon the row electrodes (scanning electrodes) SL disposed on one substrate. An image signal is applied in synchronous relation with a row selection signal upon the column electrodes (signal electrodes) DL disposed on the other substrate. The overlap regions (which are shown by oblique lines) between the row electrodes SL and the column electrodes DL become picture elements and the liquid crystal sandwiched between both the electrodes responses to the potential difference between them. When one of both the electrodes is divided every picture element, each of this portion is called a picture element electrode.

As the liquid crystal responses to the effective value in this method, the number of the scanning lines cannot be rendered large because of crosstalk, dynamic range.

To overcome such restriction as described hereinabove, a multiple matrix has been devised. This is a method of increasing the number of the picture elements in a scanning electrode direction, instead of increasing the number of the scanning electrodes, by deformation of the signal electrode of the simple matrix. (Read "Liquid-Crystal Electronics Base and Application" (Ohm Company, 1979) edited by Sasaki).

Liquid crystal apparatus of duplex matrix and quadruplex matrix are now put on the market or being manufactured for trial. In the duplex matrix graphically shown in FIG. 7(B), the number of the scanning electrodes SE is kept the same as before, the number of the signal electrodes DL is rendered twice, the number of the picture elements (which are shown by oblique lines), and the adjacent two rows of picture elements are simultaneously scanned.

As the shape of the signal electrodes becomes complicated to produce the narrow wiring-width portion in the multiplex matrix, the wiring portion in the multiplex matrix, the wiring resistance is likely to become high. When the wiring resistance of transparent conductive film only cannot be made sufficiently low, metallic wirings are jointly used. When the metallic wirings are used, effective picture element area reduces to make the picture face dark. Also, once the multiplex degree increases, the area of the wiring portion becomes relatively large to reduce the effective picture-element area.

Also, the following two systems which are effective when the number of the picture elements is large have been developed.

(2) ADDITION OF NONLINEAR ELEMENT

There is a method of adding to each picture element a nonlinear element, such as varistor, back-to-back diode, MIM (metal/insulator/metal) or the like, as an active element to suppress the crosstalk. As shown graphically in FIG. 7(C), picture element electrodes PE corresponding to the respective picture elements are provided and are connected respectively with the signal electrodes DL through the nonlinear elements NL. The scanning electrodes SL are disposed, on the opposite substrate, in a direction normal to the signal electrode DL. As shown in oblique lines, the picture element is located in the overlapped portion between the picture element PE and the scanning electrode SL.

(3) ADDITION OF SWITCHING ELEMENT

This is a method of adding a switching transistor, as an active element, to each picture element to individually drive it. As shown graphically in FIG. 7(D), a picture element electrode PE corresponding to each picture element is provided and is connected with a signal electrode DL through a switching element SW. Scanning electrodes SL are provided in a direction normal to the signal electrode DL and are connected with the gate of the switching element SW. On the other hand, a common electrode CE is provided on its opposite substrate. The picture element is provided on an overlapped portion between the picture electrode PE and the common electrode CE as shown in oblique lines. A storage capacitor is added when necessary. A driving voltage is applied and the capacitor is charged during a selection period, and the applied voltage is held by the capacitor even during a non-selection period. As the liquid crystal itself is also capacitive load and its time constant of discharge is sufficiently larger than a repeated period of the driving, the storage capacitor can be omitted. A thin film transistor, a MOS-FET formed on silicon wafer or the like is used as a switching transistor.

Although not shown concretely in the above description, a color filter is disposed corresponding to each picture element in a color liquid-crystal display apparatus.

The present invention is applicable to the above-described methods (1) through (3), and the effect is large particularly in the case of the (3).

The color arrangement which is the subject of the present invention will be described hereinafter. A color liquid-crystal display apparatus using the liquid crystal is already disclosed in such as U.S. Pat. No. 3,840,695. An XY matrix display apparatus using three primary colors of stripe-shaped color-filter is known and a matrix display apparatus with a thin film transistor (TFT) being provided per picture element electrode is disclosed in the latter. In these examples, described only the use of the three primary colors of stripe-shaped or mosaic-shaped color filter is described without any concrete mention of the three primary colors of arrangement method in the color arrangement. Also, in the conventional TFT matrix display substrate, the signal electrode and the scanning electrode which are connected with the column of the picture element and the row thereof were rectilinear, and all the picture-element electrodes were arranged on the same side of an intersecting point between the corresponding signal electrode and scanning electrode.

The conventional color arrangement in largely divided into a stripe shape and a mosaic shape. In the stripe-shaped color arrangement of the former, picture elements are arranged in parallel like longitudinal stripe (FIG. 8(A)) and lateral stripe (FIG. 8(B)). In the mosaic-shaped color arrangement of the latter, square or rectangular picture elements are arranged in checkered shape. Nine picture-element staircase shape (FIG. 8(C)), longitudinal six picture-element type (FIG. 8(D)), lateral six picture-element type (FIG. 8(E)), four picture-element type (FIG. 8(F)), and their modifications are also taken into consideration.

Referring to FIG. 8, reference characters R, G, B respectively show the red, green, blue of additive three primary colors, and a parenthesis {shows a basic period of the arrangement pattern of three colors (R, G, B). The six picture-element type and the four picture-element type have been proposed by the present inventors.

When picture elements sufficient in number to faithfully reproduce the picture signals are provided, the color arrangement of the picture elements does not influence the quality of the reproduced images. But when the number of picture elements is not sufficiently large, the quality of the reproduced images is adversely affected by the color arrangement. In the case of the stripe-shaped color arrangement, the color switching of the driving signal is not necessary in the longitudinal stripe and all that is necessary in the lateral stripe is to switch the color for each of the scanning lines before the analog line memory, but the spatial resolution in a direction normal to the stripe is inferior by as much as three picture elements pitch, thus causing Moire stripes easily. Also, in a condition where the white balance is filled, the brightness of the blue is so low in terms of the visibility characteristics that the blue looks extremely dark. Thus, blue lines look like black stripe patterns, thus spoiling the picture quality. On the other hand, in the case of mosaic-shaped color arrangement, in the nine picture-element staircase type, the same color of picture elements are obliquely connected in the staircase. The spatial resolution in a direction normal to its connection direction becomes $3/\sqrt{2}$ picture element pitch, thus reducing the above-described disadvantage somewhat, but the color switching of the picture signal is required for each of the signal electrodes and each of scanning electrodes.

To improve such disadvantages as described hereinabove, the present inventors have proposed the color arrangement of the six picture-element type and four picture-element type. In the six picture-element type, the blue lines become zigzag, which makes the stripe patterns less conspicuous. In the four picture-element type, the green picture-elements are arranged in checkered patterns, and the spatial resolution becomes one picture-element pitch both longitudinally and laterally, and becomes $\sqrt{2}$ picture-element pitch even in the worst oblique direction, thus resulting in considerably small anisotropy. As the blue pictures are arranged separately, no dark lines are produced. The visibility characteristics are such that the space resolution with respect to brilliance (brightness) is high, but the space resolution with respect to the color difference is not so high. In the contribution towards the brilliance, the green among the red, green, and blue is largest. Accordingly, if the green picture element faithfully reproduces a brilliance signal (Y signal), the image quality is not deteriorated even if the space resolution is half as much as the green in the red and blue picture elements.

However, in the mosaic-shaped color arrangement, the resolution and the reproduced image quality are improved, but the driving circuit of the picture element is complicated. Namely, as described hereinabove, the colors of the picture element to be driven by the same signal electrode are two or three, thus requiring the color switching of the picture signal.

FIGS. 9(A), (B) are connection diagrams in a case where the liquid crystal is driven with a thin film transistor (TFT) of the conventional mosaic-shaped picture element arrangement. All the picture-element electrodes are arranged on the same side of an intersecting point between the corresponding signal electrode and the scanning electrode. Drain electrode of TFT1, . . . and the storage capacitors which are provided when necessary are connected with the picture element electrodes arranged in mosaic shape (not shown). In the drawing, the capacitors 2 . . . are equivalent circuits showing the capacity of the liquid crystal and the point of each arrow is connected commonly to a common electrode. Each scanning electrode (gate line) 3 is connected with the gates of the TFT 1 . . . arranged laterally. Also, each of the signal electrodes (data line) 4 is connected with the source electrodes of the TFT 1 arranged longitudinally. A gate driver 5 composed of a shift register sequentially scans the scanning electrodes 3 periodically with scanning pulses (horizontal synchronizing signal H) to turn on the TF1 connected to the selected scanning electrode 3. Video signals are applied upon the signal electrodes 4 as described hereinabove, in synchronous relation, and are applied upon picture-element electrodes and capacitors 2 (not shown) through the TFT 1 to drive the liquid crystal. The capacitors 2 maintain the voltage to be applied upon the liquid crystal during a time period with the TFT 1 off. When the time constant of the liquid crystal is sufficiently large as compared with the scanning period, the storage capacitor is not required to be provided.

In the conventional mosaic-shaped color arrangement, picture elements of two colors or three colors are connected to the same signal electrode 4 to apply a signal (red, green, blue) corresponding to each color to a signal electrode 4. Each picture element selects only the corresponding signal through the periodic scanning operation of the scanning electrodes 3. As a result, a circuit which periodically switches the signals (red, green, blue) is required. In FIG. 6(A), each picture signal of the Red, Green, Blue is respectively inputted into analog line memories so that the picture signal of each color sampled is inputted into a color switching circuit 7 provided for each of the signal electrodes 4, thereby selecting a signal corresponding to the color arrangement. Here, the analog line memory 6 samples a color picture-element R, G or B to output a signal in synchronous relation to the scanning electrode. In FIG. 6(B), before the picture signal is inputted to an analog line memory 6, each picture signal of the R, G, B is time-shared in accordance with the color arrangement by a color switching 7, is converted into a serial signal and is sent into an analog line memory 6.

In the conventional mosaic-shaped color arrangement, all the picture-element electrodes are arranged on the same side of the intersecting points between the corresponding signal electrodes and scanning electrodes, and thus two colors or three colors of picture-element electrodes are connected with the same signal electrode. For example, in the case of a lateral six picture-element type arrangement, the color of a picture element to be driven by the same signal electrode alternately changes like RGRG . . . , GBGB . . . , BRBR . . . every one signal electrode. Accordingly, a color switching circuit for the signals of the analog line memory becomes necessary, thus requiring a complicated driving circuit.

SUMMARY OF THE INVENTION

An object of the present invention is to provide a color liquid-crystal display apparatus, wherein a driving circuit has been simplified in a color liquid-crystal display apparatus using mosaic-shaped color arrangements.

A color liquid-crystal display apparatus of the present invention has picture elements corresponding to the respective intersecting points between the signal electrodes and the scanning electrodes and a coloring means of three colors, red, green, blue disposed corresponding to each picture element, a picture element corresponding to the same color being alternately disposed on both sides of at least one portion of signal electrodes or scanning electrodes.

BRIEF DESCRIPTION OF THE DRAWINGS

This object and other objects and features of the present invention will become apparent from the following description taken in conjunction with the preferred embodiment thereof with reference to the accompanying drawings, in which.

DETAILED DESCRIPTION OF THE INVENTION

Figure 1B:
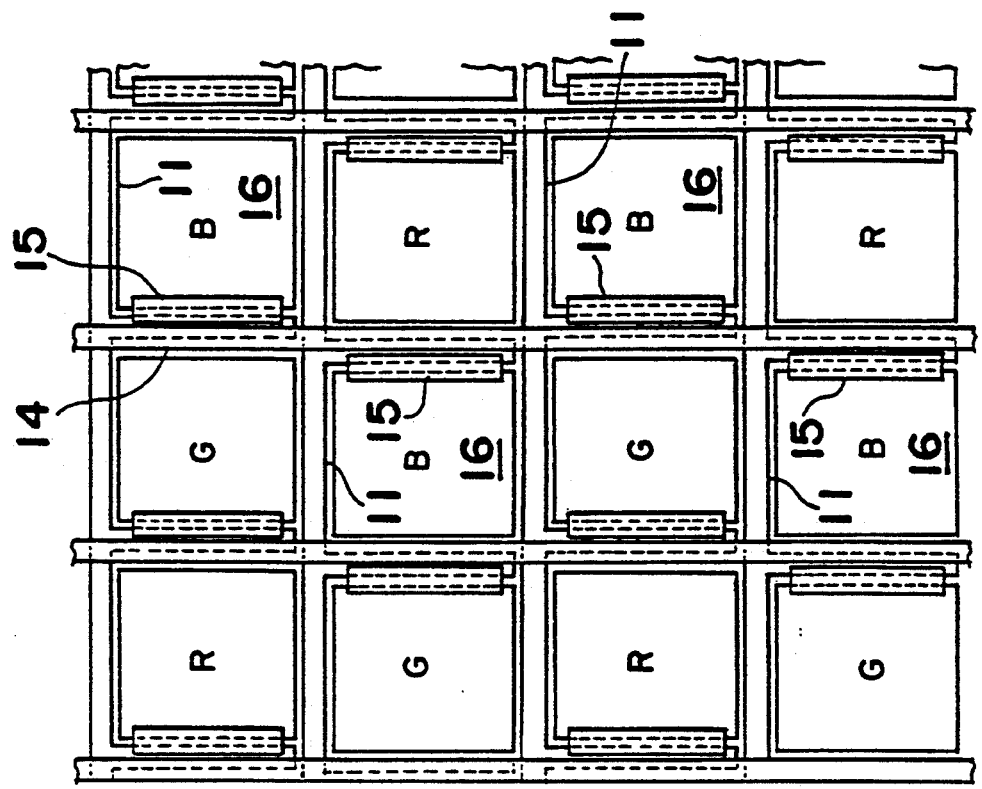
FIGS. 1(A), 1(B) are views each showing the arrangements of picture-element electrodes, signal electrodes and scanning electrodes in the embodiment, in accordance with the present invention, of a liquid-crystal display apparatus with a switching element added thereto.

Before the description of the present invention proceeds, it is to be noted that like parts are designated by like reference numerals throughout the accompanying drawings.

The present invention is characterized in that picture elements driven by the same signal electrode are disposed right and left alternately. Accordingly, a color switching circuit of the output of an analog line memory becomes unnecessary as described hereinafter.

Figure 1A:
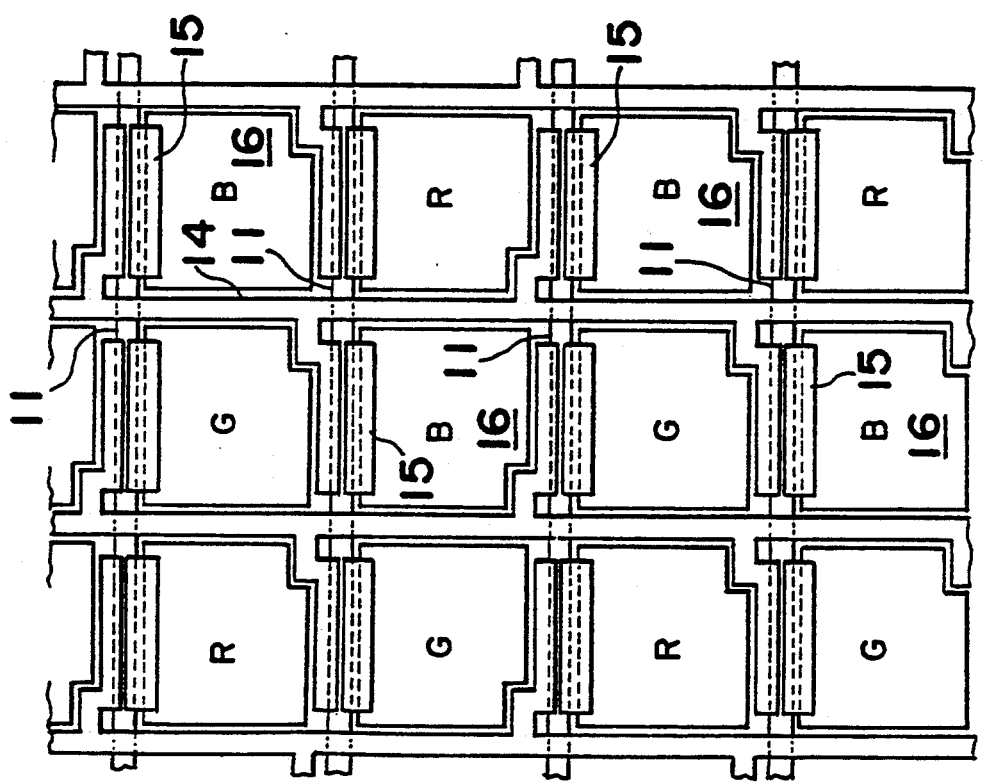
Figure 8A:
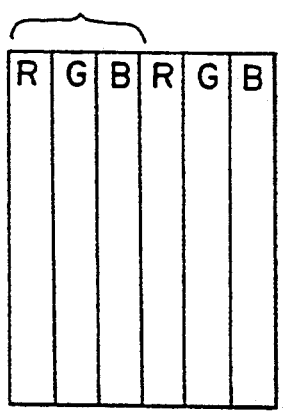
FIG. 8(A), 8(B), 8(C), 8(D), 8(E), 8(F) are views showing the conventional color arrangements, wherein (A) shows a longitudinal stripe type, (B) a lateral stripe type, (C) a nine picture-element staircase type, (D) a longitudinal six picture-element type, (E) a lateral six picture-element type, (F) a four picture-element type.
Figure 8B:
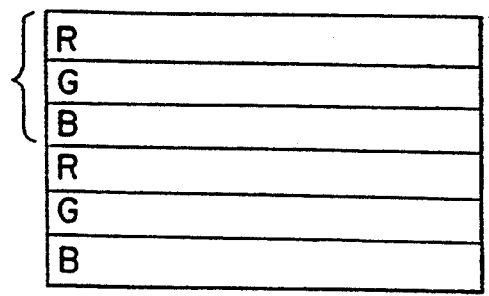
Figure 8C:
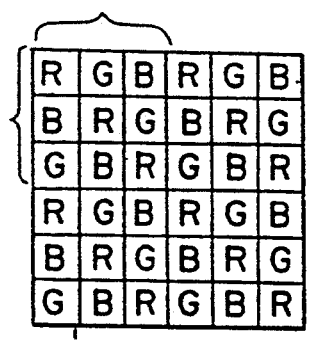
Figure 8D:
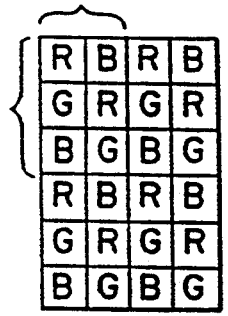
Figure 8E:
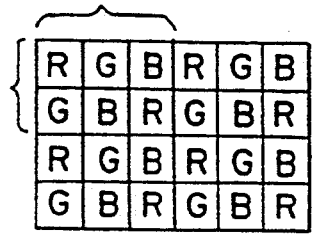

An embodiment of a liquid-crystal display apparatus with a switching element added to the color arrangement of a lateral six picture-element type (FIG. 8(D)) is shown in FIGS. 1(A), (B), wherein scanning electrodes 11 are longitudinally arranged in parallel, and signal electrodes 14 are laterally arranged in parallel. R, G, B attached to the picture-element electrodes 16 show the arrangement of the color respectively. FIG. 1(A) is one example of a pattern in a case where the signal electrode 14 is branched to constitute a thin film transistor. FIG. 1(B) is one example of a pattern in a case where the scanning electrode 11 is branched to constitute a thin film transistor. For simplicity, the semiconductor film 13 and the insulating film 12 of the cross portion between the signal electrode 4 and the scanning electrode 11 are omitted. Under the above-construction, the same signal electrode 14 is connected only to the same color of picture-element electrodes arranged right and left alternately. Accordingly, a color switching circuit for the output signal of an analog line memory becomes unnecessary, which is different from the conventional case.

Figure 2A:
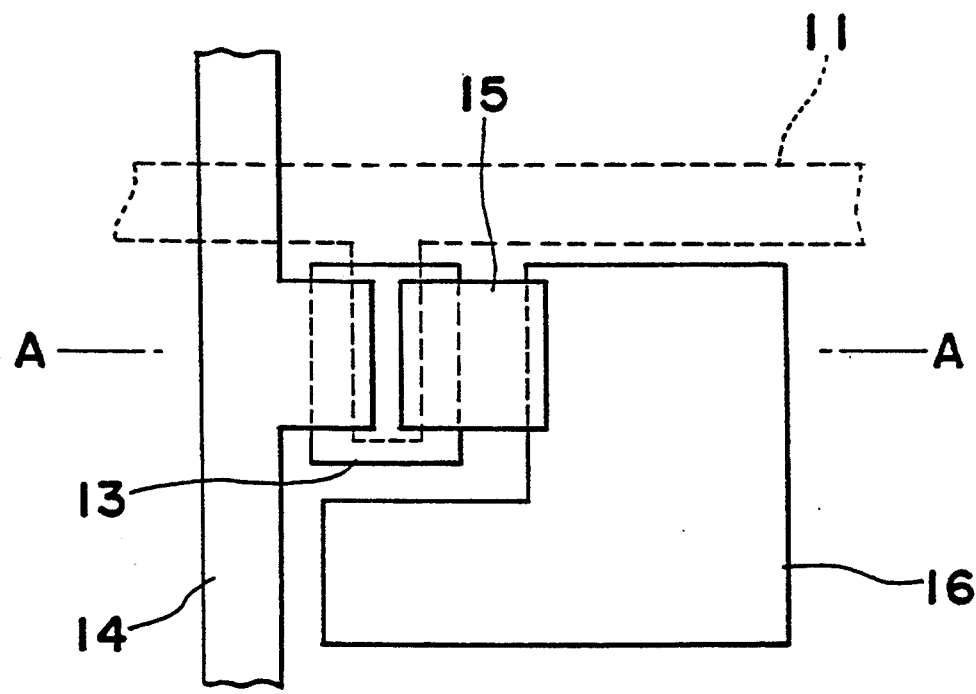
FIG. 2(A) is a plan view of TFT.
Figure 2B:
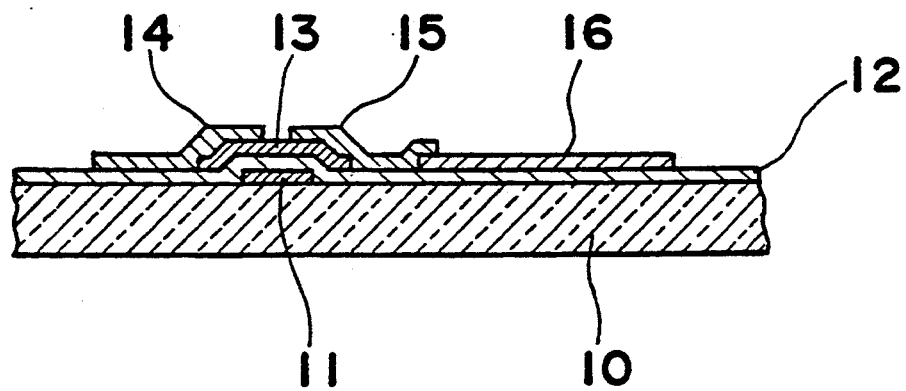
FIG. 2(B) is a cross-sectional view taken along a line A—A of FIG. 2(A)

As the thin film transistor (TFT) is used as a switching element in the present embodiment, the construction of the TFT will be described hereinafter. FIG. 2(A) is a plan view showing one example of a thin film transistor (TFT), which is a switching element. FIG. 2(B) is a cross-sectional view taken along a line A—A of FIG. 2(A). The TFT has a scanning electrode 11, a gate insulating film 12, a semiconductive film 13, a signal electrode 14 and a drain electrode 15 sequentially patterned and laminated on a transparent insulating substrate 10 of glass or the like. A picture-element electrode 16 and a storage capacitor (not shown) which is provided at need are connected with the drain electrode 15. A vacuum evaporating method, a sputtering method, a CVD method, a plasma CVD method, a low pressure CVD method or the like is used as a thin film forming method, and the patterning is performed by the art of shadow mask or photo-lithography. To drive the liquid crystal by a substrate with this TFT being formed thereon, optical shield and orientation layer are further provided. If a positive voltage is applied upon the scanning electrode 11 when an n type semiconductor has been used as a semiconductor film 13, an accumulation layer of electrons is formed on the surface on the side of the gate insulating film 12 of the semiconductive film 13 to modulate the resistance between the signal electrode (source electrode) 14 and the drain electrode 15.

Figure 3:
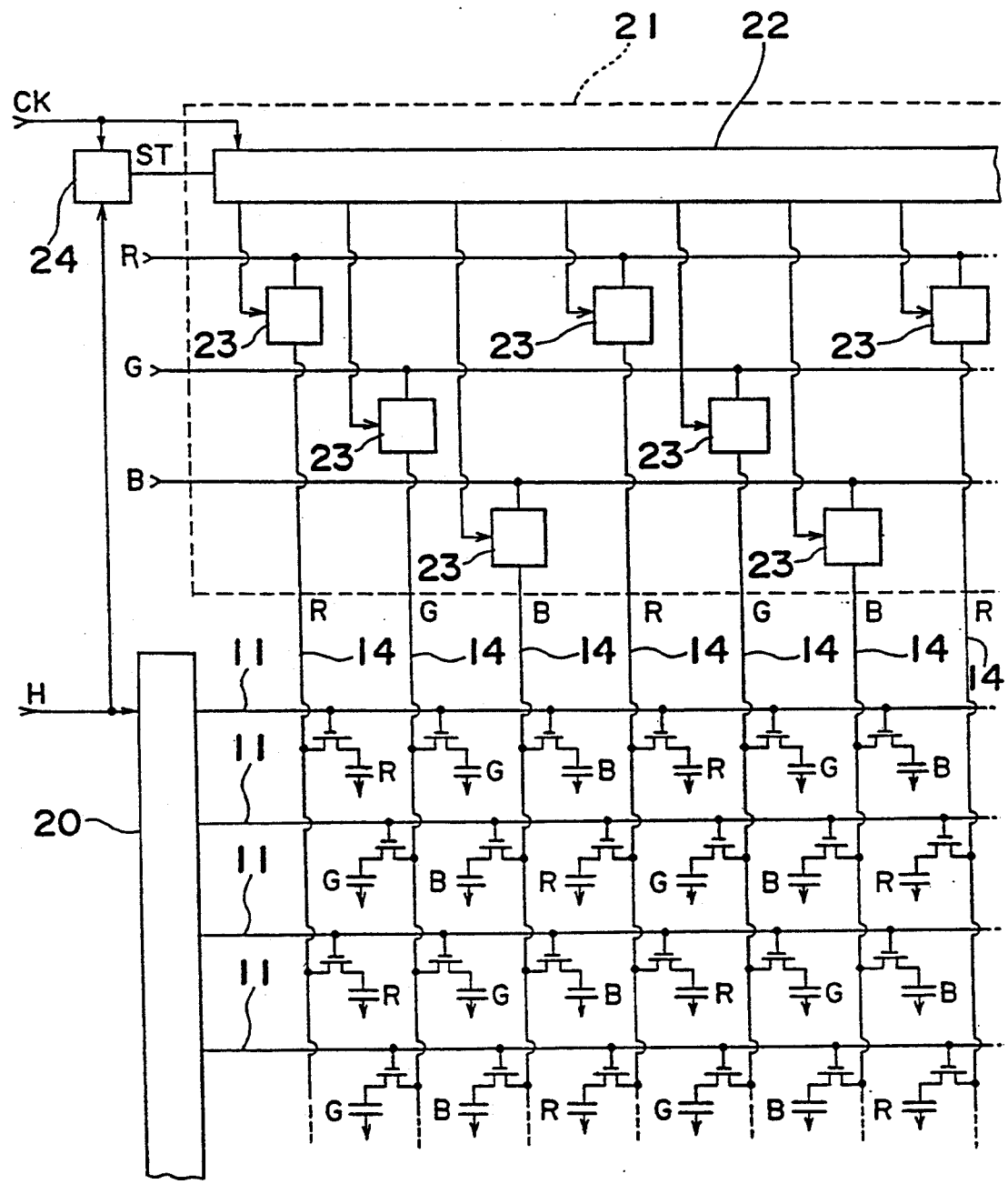
FIG. 3 is a driving circuit diagram in an embodiment of a six picture-element type mosaic arrangement.

FIG. 3 shows an example of a driving circuit corresponding to FIG. 1(A). A gate driver 20 composed of a shift register scans the scanning electrodes 11 sequentially by a horizontal synchronizing signal H to turn on the transistors 2 connected with the selected scanning electrode 11. The time width of the gate pulse does not always necessarily have to be 1H (horizontal scanning time) and pulses to be applied upon each scanning electrode may be overlapped. To make the width of the gate pulse larger than 1H is has been proposed by the present inventors. The aim of that invention is to turn on the scanning electrode 11 prior to the original timing to preliminarily charge the liquid crystal and the storage capacitor. For use in the present embodiment, the same color of picture signals are normally applied upon the same signal electrode 14 and the correlation of the signals between the adjacent scanning lines is high in the normal picture signal so that the effect of the preliminary charging is large to render the crosstalk between the colors inconsequently.

An analog line memory 21 for driving the signal electrode is composed of a shift register 22 and sample hold circuits 23. The shift register 22 sequentially transfers start pulses ST by a clock pulse CK of a period P (=effective horizontal scanning period/number of horizontal picture elements) to generate sampling pulses. The sample hold circuits 23 receive the sampling pulses to sample the color picture signals R, G, B to drive the signal electrodes 14 in synchronous relation to the gate signal H. The picture elements to be driven by the same signal electrodes 14 are the same in color in the arrangement of the picture elements of the present embodiment so that the color switching operation of the picture signals to be inputted to the sample hold circuits 23 is not required.

A start pulse delay circuit 24 shifts the sampling timings of the odd scanning lines and the even scanning lines. The images to be regenerated are shifted right and left every one scanning electrode, with the sampling timing of an analog line memory being fixed in the picture-element arrangements shown in FIGS. 1(A), 1(B), thus lowering the resolution. This inconvenience is avoided through shifting of the sampling timing by time equivalent to one picture element between the selected scanning electrode in an odd number and in an even number. To shift the timing of the sampling, a start pulse is to be inputted to the shift register from the start pulse delay circuit 24 only in accordance with the odd number or the even number of the selected scanning electrode.

Figure 4A:
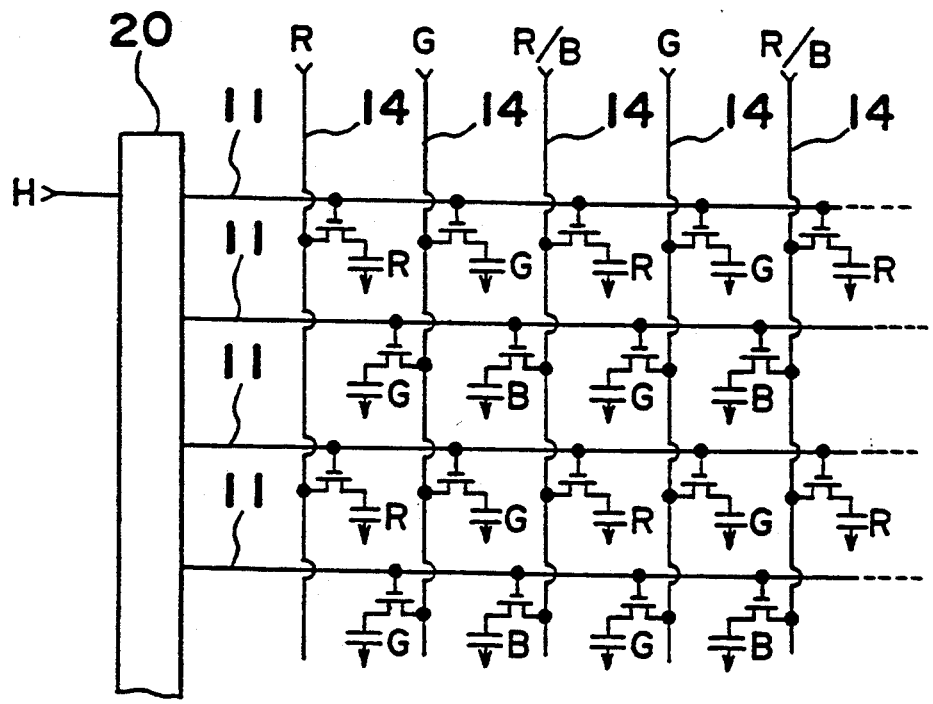
FIGS. 4(A), 4(B) are respectively driving circuit diagrams of a four picture-element type mosaic arrangement.
Figure 4B:
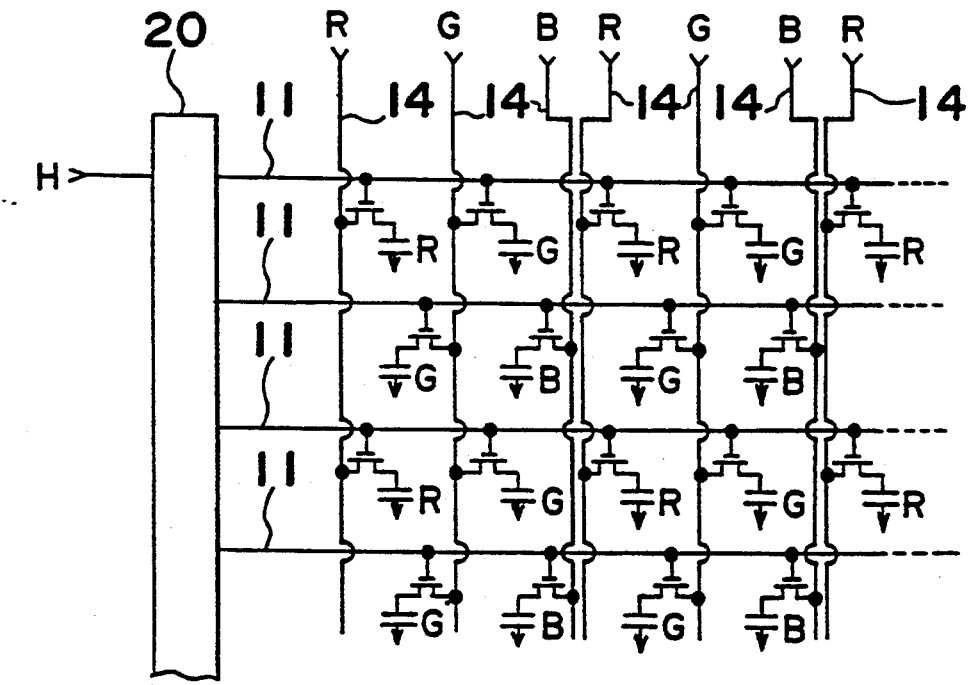
Figure 8F:
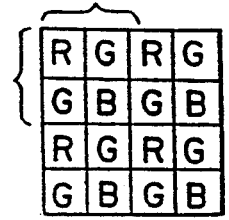
Figure 9A:
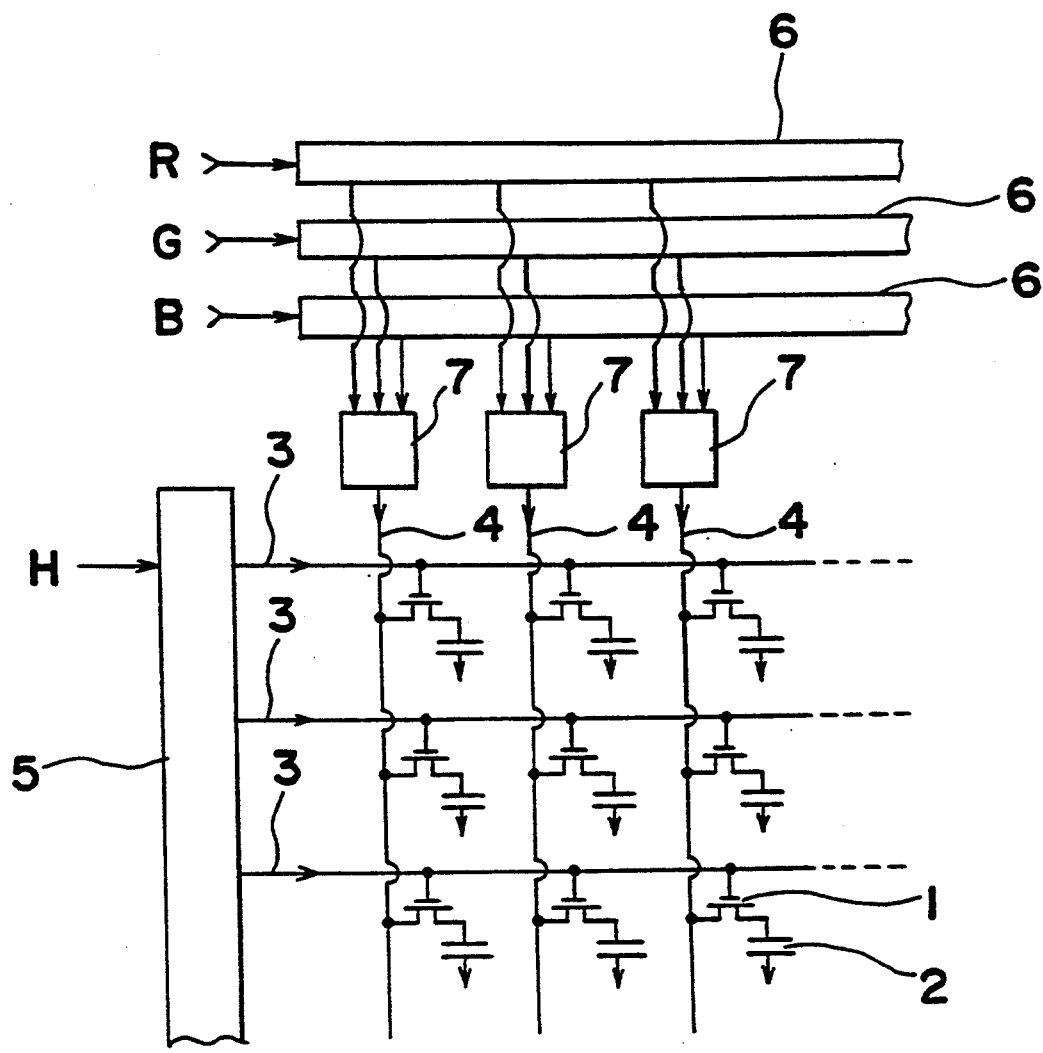
FIGS. 9(A), and 9(B) are respectively connection diagrams in the case where the liquid crystal is driven by the thin film transistor (TFT) panel of the conventional mosaic-shaped picture-element arrangement.
Figure 9:
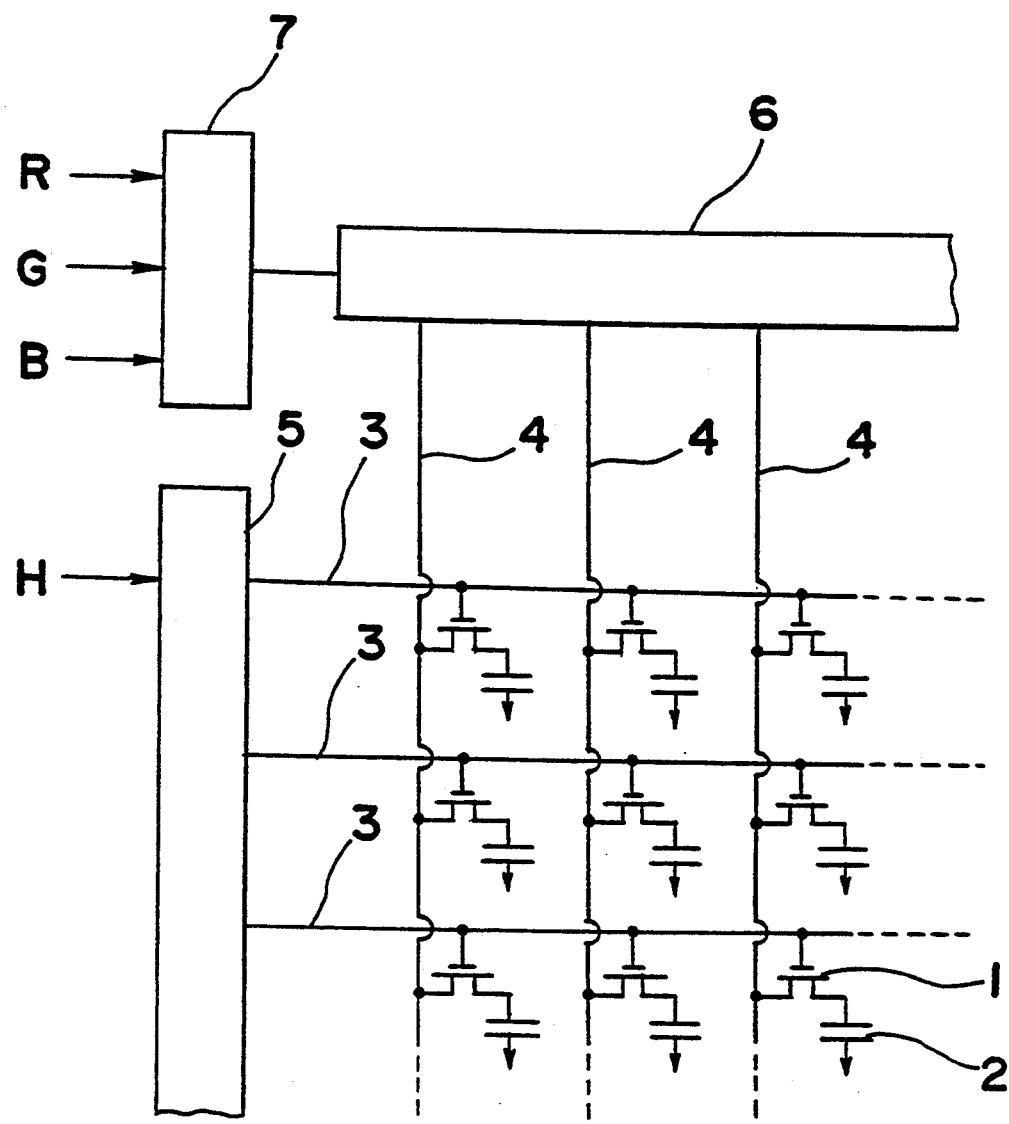

It is to be noted that the construction should be provided as shown in FIG. 4(A) in a case where the present invention is applicable to the arrangement of a four picture-element type (FIG. 8(F)). In this case, the Green is not required to be switched, but a color switching circuit between the Red and the Blue is required. In such construction as shown in FIG. 4(B), the number of the signal electrodes 14 increases, but the color switching is not required.

In the above embodiment, the picture elements to be driven by the same signal electrode are arranged right and left alternately, but the same effect is caused even when the picture elements have been alternately arranged upwardly and downwardly of the same scanning electrode. In this case, a delay element such as surface acoustic wave (SAW) element or the like or an analog line memory is used, with the result that it is necessary to retain a picture signal on a scanning line before the scanning line is scanned.

Then, a substrate on a common electrode side with transparent conductive film and color filter provided on the transparent substrate of glass or the like is made by a known method although not shown. An interference filter, organic or inorganic dye or pigment are used as the color filter. In the color filter, three primary colors are arranged in a mosaic to suit the color arrangement of the above-described picture element electrodes by a photo-lithography or a printing method. Transparent conductive film composed of ITO is provided thereon by a method of ion plating or the like. An orientation layer for orientating the liquid crystal is provided thereon.

A substrate with picture-element electrodes disposed thereon and a substrate with common electrodes disposed thereon are sealed to each other through a spacer, and a liquid crystal is impregnated into the gap between the the operation mode of the liquid crystal is TN, a polarizer plate is provided on both faces of the liquid crystal panel.

The present invention is applicable even to a liquid crystal display apparatus with a switching element added thereto (simple matrix system, adding system with a nonlinear element thereto, or the like).

Figure 5:
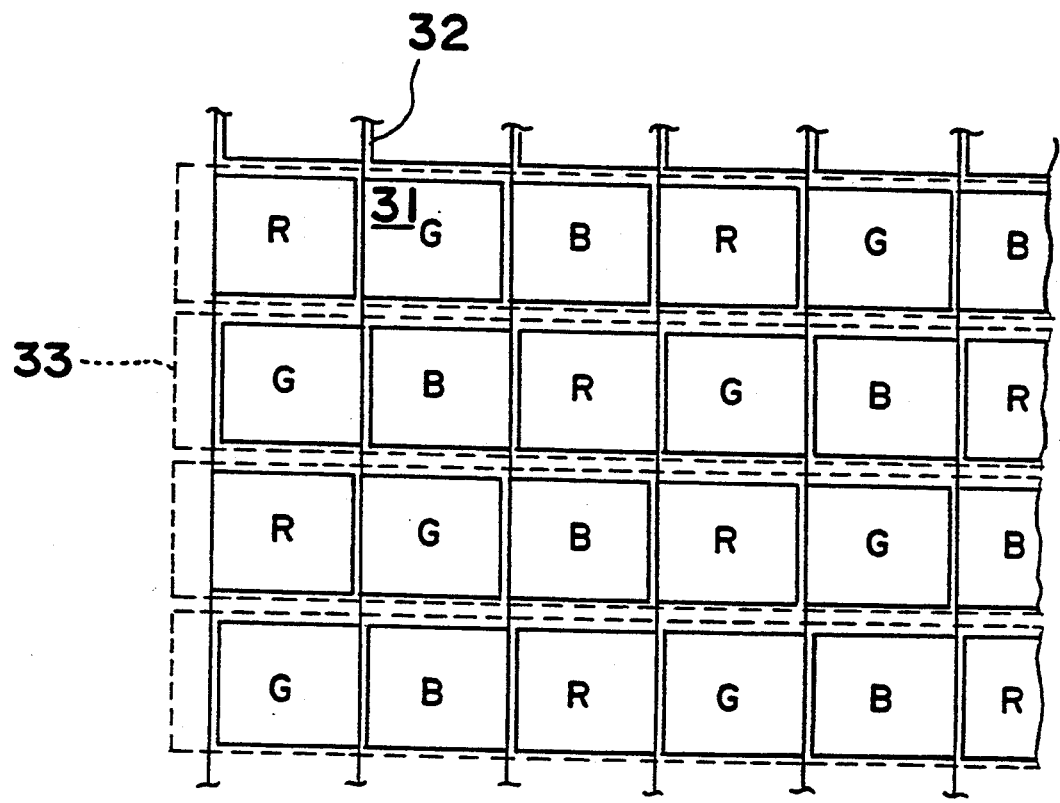
FIG. 5 is a view showing the arrangements of picture-element electrodes, signal electrodes and scanning electrodes in the embodiment of the present invention of a liquid-crystal display apparatus of simple matrix display.

FIG. 5 is an embodiment of a liquid crystal display apparatus of the simple matrix display with respect to the color arrangement of a lateral six picture-element type (FIG. 8(D)). The picture-element electrodes 31 are arranged in a lateral six picture-element type. The R, G, B attached to each picture-element electrode 31 show the arrangement of the color. The signal electrodes 32 are arranged longitudinally in parallel and the same signal electrode 32 is connected only to the same color of picture-element electrodes arranged right and left alternately. The signal electrodes 32 and the picture-element electrodes 31 are formed by the identical process with transparent conductive film, but the signal electrodes 32 may be made of metal. On the other hand, scanning electrodes 33 each having width corresponding to the picture-element electrode 31 are laterally arranged in parallel on the opposite substrate.

Figure 6:
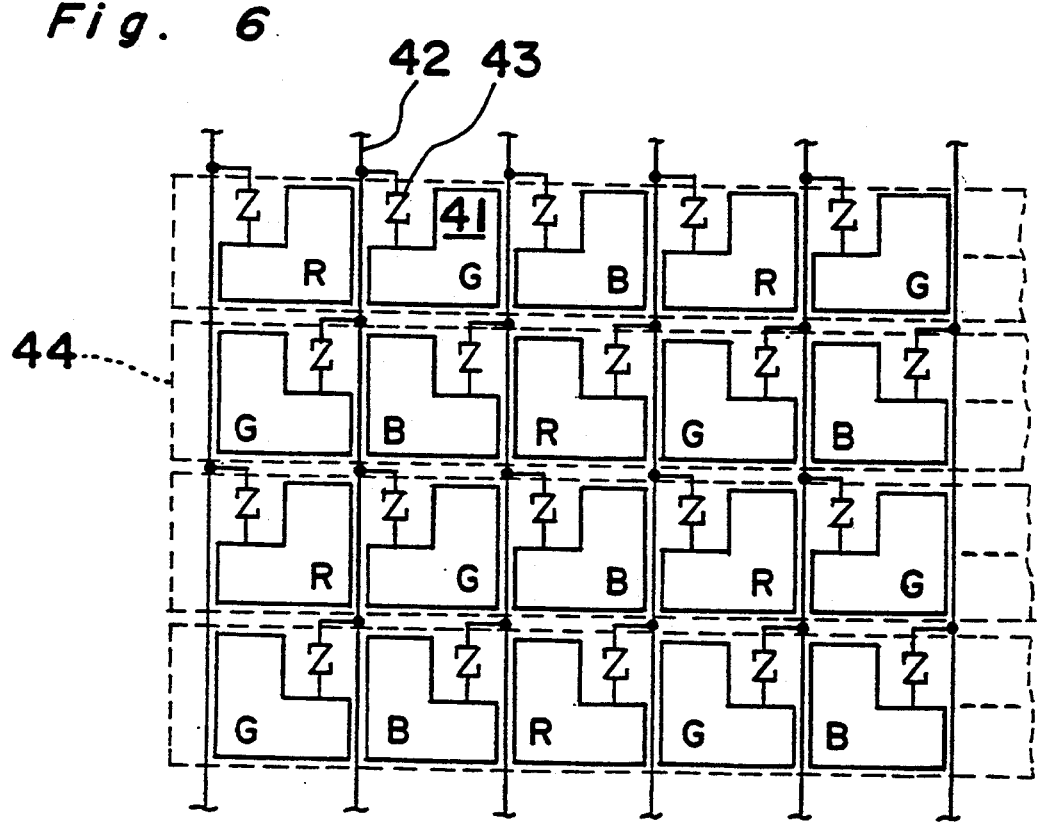
FIG. 6 is a view showing the arrangements of picture-element electrodes, signal electrodes and scanning electrodes in the embodiment of the present invention of a liquid crystal display apparatus with a nonlinear type element added thereto.
Figure 7A:
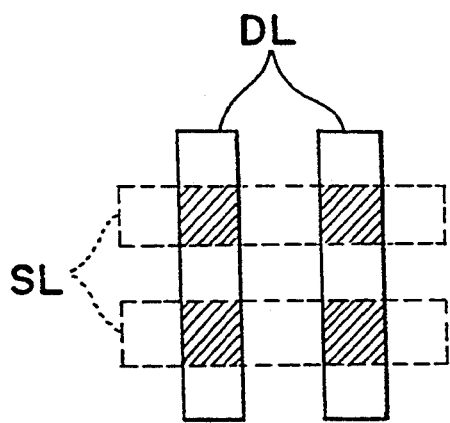
FIGS. 7(A), 7(B), 7(C), 7(D) are views each showing a method of various matrix displays, wherein (A) shows simple matrix, (B) double matrix, (C) double matrix with non-linear elements added thereto, (D) matrix with switching elements added thereto.
Figure 7B:
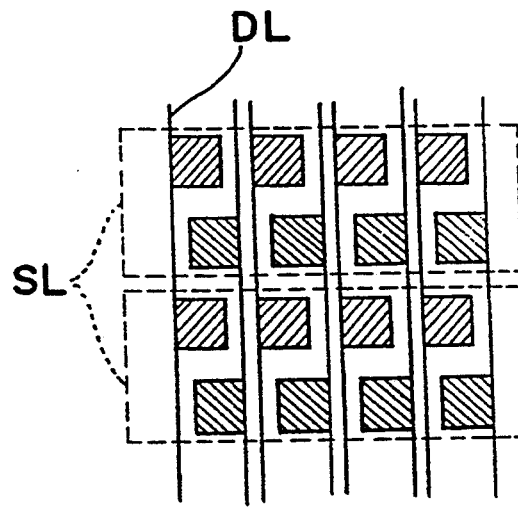
Figure 7C:
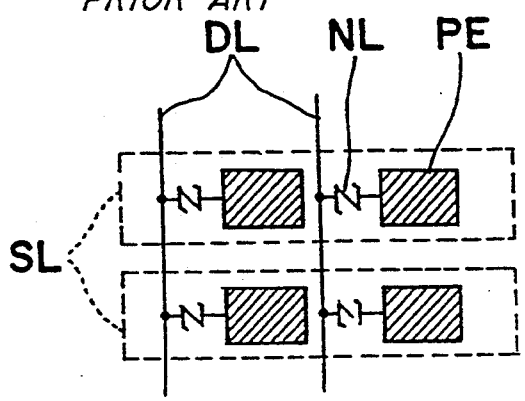
Figure 7D:
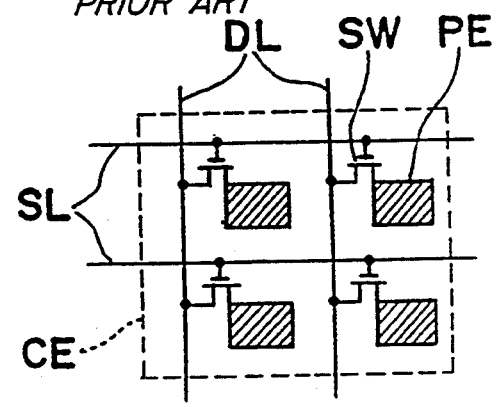

FIG. 6 is an embodiment of a liquid crystal display apparatus of matrix display with a nonlinear element added thereto with respect to the color arrangement of a lateral six picture-element type (FIG. 8(D)). The picture-element electrodes 41 are arranged in a lateral six picture-element type. The R, G, B attached to each picture-element electrode show the arrangement of the color. The signal electrodes 42 are longitudinally arranged in parallel and only the same color of picture-element electrodes arranged right and left alternately are connected through a nonlinear element 43 to the same signal electrode 42. On the other hand, scanning electrodes 44 each having width corresponding to the picture-element electrode 41 are laterally arranged in parallel on the opposite substrate.

Normally the picture elements are driven by a voltage averaging method (see the book described above) in a simple matrix system and an adding system with nonlinear elements added thereto. To produce a half tone, the width of the selection pulse width to be applied upon a signal electrode is modulated in accordance with gradation (see Television Society Journal 31, 940 (1977)). To apply the present invention to this case, a pulse width modulation circuit is provided between a signal electrode 14 and a sample hold circuit 23 of an analog line memory 21 of FIG. 4. This circuit is adapted to modulate the width of the selection pulse to be applied upon the signal electrode in accordance with a picture signal sample-held by a sample hold circuit 23.

Also, a digital line memory, instead of an analog line memory 21, may be used. In this case, the picture signals are converted into a digital signal by an A/D converter and sequentially stored in the digital line memory. Then, the width of the selection pulse to be applied upon the signal electrode is controlled by a digital picture signal stored in the digital line memory. In this case, a method is used of generating a series of pulses each being different in the pulse difference in accordance with the number of the bits of the A/D conversion and selecting by a multiplexer a pulse of the pulse width corresponding to the level of the picture signal.

Even when the analog line memory or the digital line memory is used, the color switching is required in the conventional construction, but in the present invention, the color switching becomes unnecessary as in a case where the switching element has been added.

As is clear from the foregoing description, according to the present invention, in a color liquid-crystal display apparatus using mosaic arrangements, the same color of picture elements which are driven by the same signal electrode are alternately arranged right and left. Accordingly, all that is necessary is that the same color of picture signal is applied upon the same signal electrode in spite of the mosaic arrangement. Thus, a circuit, which switches a color image signal of an analog line memory is unnecessary, so that the driving circuit is extremely simplified.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An apparatus for driving a color liquid crystal display device including a plurality of scanning electrodes linearly arranged in a first direction, a plurality of signal electrodes linearly arranged in a second direction perpendicular to the first direction, and a plurality of picture elements, one corresponding to scanning and signal electrode intersections, the picture elements being of a red, blue, or green color, wherein the plurality of picture elements comprise a plurality of picture element groups, each of said plurality of picture element groups arranged in a pixel mosaic matrix, the matrix including a plurality of orthogonally disposed rows and columns of picture elements, the number of columns being two and the number of rows being three, the apparatus comprising:

gate driving means for sequentially applying voltage to each of the plurality of scanning electrodes; and line memory means for applying voltage to each of the plurality of signal electrodes based upon input red, green and blue data signals, to thereby drive corresponding red, green and blue color picture elements, arranged in one pixel element pitch, in said first direction, the line memory means including, a plurality of sample and hold means, each corresponding to one of said plurality of signal electrodes and one of said red, green, or blue colors, each for sampling and holding one of said red, green, and blue input data signal, and shift register means for sequentially activating each of said plurality of sample and hold means to sequentially allow application of voltage to each of said plurality of signal electrodes, based upon said data input signals, and sequentially driving of red, green and blue picture elements, said pixel mosaic matrix permitting each of said plurality of signal electrodes, which are connected to picture elements on each side, to be connected to a plurality of same color picture elements alternately arranged on each side of each of said plurality of signal electrodes.

2. The apparatus of claim 1 wherein said picture elements are arranged on alternate sides of the signal electrodes.

3. The apparatus of claim 2, wherein only picture elements of the same color are connected to each signal electrode.

4. The apparatus of claim 1, further comprising:

state pulse delay means, operatively connected to said gate driving means and said line memory means, for shifting timing of sequential sample and hold means activation in said shift register means by the equivalent of one picture element.

5. The apparatus of claim 1, further including a non-linear element connecting each color picture element to respective scanning electrodes.

6. The apparatus of claim 1, further including a switching element connecting each color picture element to respective scanning electrodes.

7. A color liquid crystal display apparatus, comprising:

a plurality of picture element groups arranged in a pixel mosaic matrix, the matrix including a plurality of orthogonally disposed rows and columns of picture elements, the number of columns being two and the number of rows being two, each picture element group including, a plurality of color picture elements each equal in area and each associated with a color corresponding to red, green or blue, a plurality of scanning electrodes linearly arranged in parallel rows and disposed over said matrix in a first direction, and a plurality of signal electrodes linearly arranged in parallel columns and disposed over said matrix in a second direction perpendicular to said first direction including, a plurality of green signal electrodes for transmitting a green color signal to a plurality of green picture elements, a plurality of combination red and blue signal electrodes for transmitting a red color signal to a plurality of red picture elements and a blue color signal to a plurality of blue picture elements; and color signal switching means for selecting one of the red color signal and the blue color signal for each of said plurality of combination red and blue signal electrodes for each of a plurality of clock cycles connected to a sample and hold means.

8. The apparatus of claim 7, further including a non-linear element connecting each color picture element to respective scanning electrodes.

9. The apparatus of claim 7, further including a switching element connecting each color picture element to respective scanning electrodes.

10. An apparatus, as claimed in claim 7, wherein each picture element group is arranged in an "L" configuration consisting of two picture elements disposed over a scan electrode in a first line and one picture element disposed over a scan electrode in a second line.

11. A color liquid crystal display apparatus comprising:

a plurality of picture element groups arranged in a matrix, each picture element group including, a plurality of color picture elements, each of the plurality of color picture elements equal in area, each associated with a color corresponding to red, green or blue, and each associated with a type corresponding to first-type, second-type, or third-type, wherein a set of said plurality of color picture elements includes four of said plurality of color picture elements and a ratio of first-type color picture elements to second-type or third-type color picture elements is two to one;

and said first-type color picture elements are arranged on both sides of a signal line, and said second-type and third-type color picture elements are arranged on both sides of the signal line, in different scanning lines; and a plurality of signal supply driving circuits including a first terminal to input a signal from a shift register and a second terminal to input one or two of red, green, and, blue signals for driving said plurality of color picture elements;

wherein at least one of said plurality of signal supply driving circuits does not include a color switching circuit for driving color picture elements of different colors.

12. A color liquid display crystal display apparatus according to claim 11, wherein said plurality of signal supply driving circuits includes a color switching circuit for second-type color and third-color picture elements.

* * * * *